(No Model.) 2 Sheets—Sheet 1.

S. L. TRIPPE.
COMPOSITION FOR ELECTRODES FOR SECONDARY BATTERIES.

No. 344,882. Patented July 6, 1886.

WITNESSES:

Sylvanus L. Trippe
INVENTOR

BY R. G. Dyrenforth,
his ATTORNEY (No Model.) 2 Sheets—Sheet 2.

S. L. TRIPPE.
COMPOSITION FOR ELECTRODES FOR SECONDARY BATTERIES.

No. 344,882. Patented July 6, 1886.

UNITED STATES PATENT OFFICE.

SYLVANUS L. TRIPPE, OF DENVER, COLORADO.

COMPOSITION FOR ELECTRODES FOR SECONDARY BATTERIES.

SPECIFICATION forming part of Letters Patent No. 344,882, dated July 6, 1886.

Application filed August, 7. 1885 Serial No. 173,845. (No specimens.)

*To all whom it may concern:*

Be it known that I, SYLVANUS L. TRIPPE, a citizen of the United States, residing in the city of Denver, in the county of Arapahoe and State of Colorado, have invented certain new and useful Improvements in the Process of Making Electrodes for Secondary Electric Batteries; and I hereby declare the following to be a full, clear, and exact description of the same.

The invention relates to secondary or storage battery elements or electrodes.

The object is to produce a substance from which secondary or so-called "storage" battery elements or electrodes may be produced, which, while capable of being readily made porous to present as great a surface as possible in use, while capable of having the substance the oxidation of which is essential to the operativeness of a secondary battery perfectly or properly oxidized, and while capable of having the oxide formed in immediate contact with or as a component part of the electrode itself, shall, when suitably prepared for the use indicated, be more tenacious and less fragile than heretofore, and thus present a powerful, durable, and most efficient secondary-battery element when as such in use.

The invention consists, first, in a composition from which an electrode for a secondary or storage battery may be made by withdrawing one of the ingredients, either by electrical or chemical action, leaving at least two others, one whereof is the active agent, while the other serves as a bond to hold it together, and thus preserve the electrode from crumbling or premature breaking down in use after it has been formed.

The invention consists, furthermore, in a composition of metals from which an electrode for a secondary or storage battery may be made, which consists of lead, zinc, and silver, the zinc to be withdrawn from the mixture by chemical or electrical action, and the lead to be oxidized, the result to form an electrode for storage-batteries.

Figure 1:
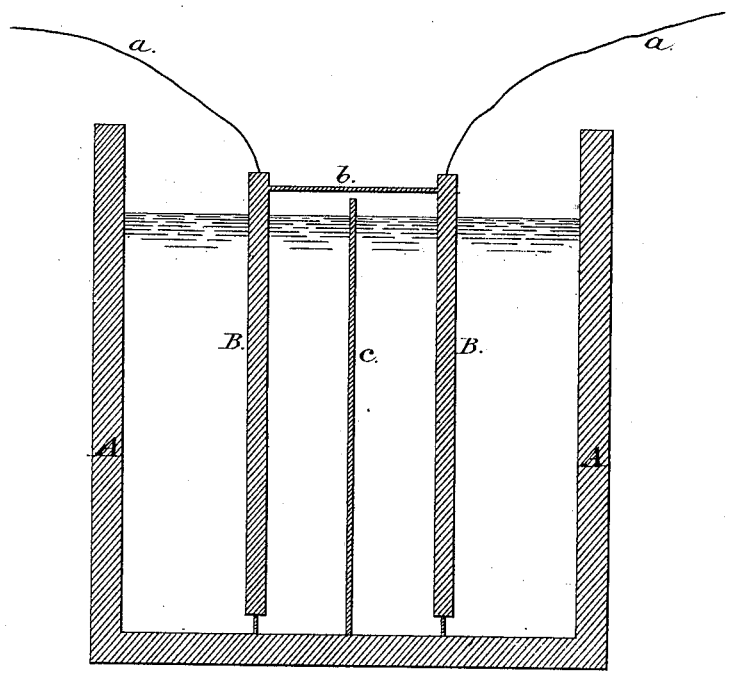
Figure 2:
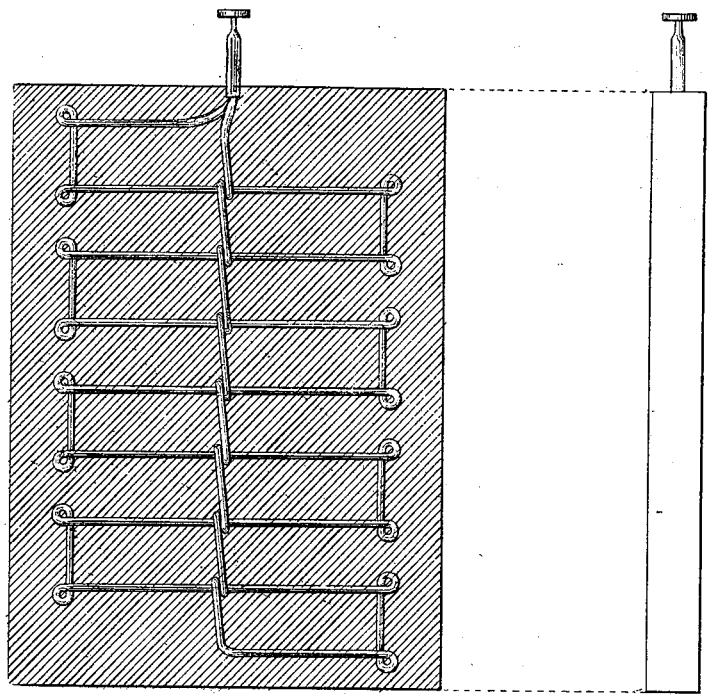

In the accompanying drawings, forming part of this specification, Figure 1 is a view in vertical cross-section of a battery, showing the electrodes in couples connected in an electric circuit. Fig. 2 is a view in vertical longitudinal section through one of the plates or electrodes, showing the same combined with a coil of wire around and through it.

In the varying methods in general use for making elements or electrodes for storage-batteries lead in some form is the material usually employed. There are many processes employed, which need not be described herein, having for their object the making of the lead plates porous, in order to obtain as great a surface as possible with the quantity of lead employed, and in many cases oxide of lead is attached to the surfaces of the plates by various devices to increase the supposed storage capacity of the mass.

There are many practical objections to the usual manner of manufacturing electrodes for use in storage-batteries, among which it is only necessary to mention the difficulty of keeping the oxide of lead in a coherent body in battery; a reasonable doubt whether oxide of lead, unless in immediate contact with the electrode or adhering thereto, adds to the storage capacity of the battery, and the fact that when lead plates have become sufficiently porous to act with effect they are so far decomposed as to be very fragile and prone to fall to pieces. The length of time required to form or prepare lead plates by the well-known Planté process is also an objection, while the action or "storage capacity," so termed, of such electrodes is so limited with difficulty in obtaining discharge of a current of sufficient electro-motive force therefrom that when much storage capacity is wanted very heavy, inconvenient, and costly plates are required. To overcome these and other defects, and to increase the duration, efficiency, and storage capacity of secondary batteries, I proceed as follows:

I make a mixture of, say, at least three ingredients, each ingredient to be suitable for the particular use for which it is to be employed—that is to say, the one is to be capable of removal in such manner as to leave the remainder of the mass of which it forms a component part in a honey-combed or porous condition, to present the greatest possible amount of surface; the second is to act as a cement or bond, to hold the porous mass together, and the third is to be the electrically-active ingredient. I prefer to use for the material from which the electrodes are made a mixture of metals, each one hundred parts of which are composed of sixty-five parts, by weight, of metallic lead, thirty parts of metallic zinc, and five parts of metallic silver. The metals should be melted together, thoroughly mixed by stirring, and then cast. The mixture should be poured into the mold as cold as practicable, otherwise the greater specific gravity of the lead may cause an undue proportion thereof to settle to the under side of the cast plate. The office of the silver is to give strength to the plate and prevent the same from crumbling when used in the battery, though by its high conductivity it also serves to assist in rapid discharge; and also to assist in the rapid discharge of the stored electric energy, as well as to strengthen the plate, I may so inclose in the mold as to be cast with the plate a coil of wire, around and through which the melted mixture hardens in cooling. The wire should be so coiled as to extend throughout the body of the plate, and should be connected with the binding-screw cast in the plate, though I make no claim to this feature in this application.

In making electrodes of no greater size than one square foot of surface and not more than one-quarter of an inch in thickness, I find by experiment that five per cent., by weight, of metallic silver and the above-named proportions of lead and zinc will give the best practical results. In case plates of greater surface and thickness are required, the proportion of zinc and silver may be increased. I do not, therefore, wish to confine myself in all cases to the exact proportions of the metal as named above, but may vary the mixture somewhat, according to the dimensions of the electrodes required, though I have not found it desirable to use electrodes of greater thickness than one-half inch, nor to use more than ten per cent. of silver in the mixture.

To form or prepare the mass for use in a storage-battery, I place it in a strong solution of sulphuric acid in an electric circuit, when, in a very short time, (dependent upon the thickness of the plate and strength of the solution,) it becomes sufficiently porous for use. The zinc in the alloy, when acted on by the acid, is decomposed, and hereby minute perforations, somewhat similar to those seen in a thin sheet of gold and silver alloy when it has been treated with nitric acid, are produced in the plate. When the zinc in the electrodes has been decomposed by the acid, and the lead filled with fine perforations, the greatest attainable surface will be exposed, while the silver in the alloy and the copper wire will keep the plate from crumbling, and enable a rapid discharge to be had of the storage energy, thus utilizing the entire storage capacity of the electrode.

In using the electrodes herein described they may be coupled or arranged in series, charged from any convenient source of electric supply, and discharged in the manner usual with the well-known storage-batteries in general use.

Having thus fully described my invention, what I claim, and desire to secure by Letters Patent, is—

1. A composition from which an electrode for a secondary or storage battery may be made, consisting of one ingredient to be withdrawn from the others by electrical or chemical action, of another ingredient constituting the active agent of an electrode, and a third ingredient serving to hold such second ingredient together, as set forth.

2. A composition of metals from which an electrode for a secondary or storage battery may be made, which consists of lead, zinc, and silver, whereby when the zinc is withdrawn from the mixture by chemical or electrical action and the lead is oxidized an electrode for storage-batteries will be formed, substantially as described.

SYLVANUS L. TRIPPE.

Witnesses:
H. P. PARMELEE,
WM. SCOTT LEE.